US011282543B2

(12) United States Patent
Yuan et al.

(10) Patent No.: US 11,282,543 B2
(45) Date of Patent: Mar. 22, 2022

(54) REAL-TIME FACE AND OBJECT MANIPULATION

(71) Applicant: Apple Inc., Cupertino, CA (US)

(72) Inventors: Hang Yuan, San Jose, CA (US); Jiefu Zhai, San Jose, CA (US); Ming Chen, Cupertino, CA (US); Jae Hoon Kim, San Jose, CA (US); Dazhong Zhang, Milpitas, CA (US); Xiaosong Zhou, Campbell, CA (US); Chris Y. Chung, Sunnyvale, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 132 days.

(21) Appl. No.: 15/917,441

(22) Filed: Mar. 9, 2018

(65) Prior Publication Data
US 2019/0279681 A1 Sep. 12, 2019

(51) Int. Cl.
G11B 27/031 (2006.01)
G06T 5/00 (2006.01)
G06T 7/73 (2017.01)
G06K 9/00 (2022.01)
G06T 19/20 (2011.01)

(52) U.S. Cl.
CPC ........ G11B 27/031 (2013.01); G06K 9/00288 (2013.01); G06T 5/006 (2013.01); G06T 7/74 (2017.01); G06T 19/20 (2013.01); G06T 2207/10016 (2013.01); G06T 2207/30201 (2013.01); G06T 2219/2021 (2013.01)

(58) Field of Classification Search
CPC ......... G11B 27/031; G06T 7/74; G06T 5/006; G06T 19/20; G06T 2207/10016; G06T 2207/30201; G06T 2219/2021; G06K 9/00288

USPC .......................................................... 386/278
See application file for complete search history.

(56) References Cited

U.S. PATENT DOCUMENTS

| 5,227,985 A * | 7/1993 | DeMenthon | G01S 5/163 345/158 |
| 2006/0210148 A1* | 9/2006 | Nakashima | G06K 9/00208 382/154 |
| 2008/0123747 A1* | 5/2008 | Lee | H04N 19/20 375/240.16 |
| 2009/0028440 A1* | 1/2009 | Elangovan | G06K 9/6202 382/216 |
| 2013/0044958 A1* | 2/2013 | Brandt | G06K 9/00248 382/201 |
| 2014/0043329 A1* | 2/2014 | Wang | G06K 9/00201 345/420 |

(Continued)

FOREIGN PATENT DOCUMENTS

CN 105167798 A * 12/2015
WO WO 2010027250 A2 * 3/2010

Primary Examiner — Loi H Tran
(74) Attorney, Agent, or Firm — BakerHostetler

(57) ABSTRACT

Techniques are presented for modifying images of an object in video, for example to correct for lens distortion, or to beautify a face. These techniques include extracting and validating features of an object from a source video frame, tracking those features over time, estimating a pose of the object, modifying a 3D model of the object based on the features, and rendering a modified video frame based on the modified 3D model and modified intrinsic and extrinsic matrices. These techniques may be applied in real-time to an object in a sequence of video frames.

14 Claims, 5 Drawing Sheets

(56) References Cited

U.S. PATENT DOCUMENTS

| | | | | |
|---|---|---|---|---|
| 2014/0098988 A1* | 4/2014 | Brandt | ............... | G06K 9/00281 |
| | | | | 382/103 |
| 2014/0099031 A1* | 4/2014 | Brandt | ................ | G06K 9/2081 |
| | | | | 382/201 |
| 2015/0093042 A1* | 4/2015 | Zhu | ......................... | G06T 5/006 |
| | | | | 382/275 |
| 2015/0131859 A1* | 5/2015 | Kim | .................... | G06K 9/6202 |
| | | | | 382/103 |
| 2015/0326801 A1* | 11/2015 | Seshadrinathan | ...... | H04N 5/357 |
| | | | | 348/241 |
| 2016/0217318 A1* | 7/2016 | Hayasaka | .......... | G06K 9/00288 |
| 2017/0069056 A1* | 3/2017 | Sachs | .................... | G06T 7/571 |
| 2018/0182145 A1* | 6/2018 | Imoto | ................. | G06F 3/0486 |

* cited by examiner

REAL-TIME FACE AND OBJECT MANIPULATION

BACKGROUND

Cameras have become small, lightweight, and almost ubiquitous. These small cameras often have a short focal length, and are often used to capture images of objects close to the camera, such as selfie images. The combination of short focal length and small distance between an object and a camera can create a projection of the object in captured images that may seem distorted, especially in comparison to images of the object captured with longer focal lengths and longer distances to the camera. The short focal length of a wide-angle lens may create a type of lens distortion called barrel distortion. The short distance to the center of an object relative to the differences in distance to different points on an object may seem to distort the projection as portions of the object closer to the camera appear larger than portions of the object further from the camera.

For example, a selfie photo or video is a self-portrait of the person holding the camera. The object in a selfie image is typically the face of the person who is holding the camera in their hand at arm's length, or less, from their face. Furthermore, selfie images are typically taken with a camera on the front face of a smartphone so that the selfie taker can see their own image on the smartphone camera while they take the selfie. Cameras on the front face of a smartphone typically have a shorter focal length than the higher-quality cameras on the back face of a smartphone. This combination of a short focal length of a front-face camera with short arm's length distance between camera and face produce images with a projection that may appear distorted, particularly in comparison to non-selfie images of the same face taken at a longer distance by the back-face camera on the same smartphone. With a nose of a face centered and close to a camera, the nose will appear large relative to the ears of the same face because the nose will be closer to the camera, and also because barrel distortion will enlarge items in the center of the image while shrinking items toward the edges of an image.

DETAILED DESCRIPTION

This application describes techniques for editing images, including real-time editing of three-dimensional (3D) objects, such as faces, in captured video. The techniques include extracting features of an object, of a predetermined type, such as a face, from a source video frame, and estimating a pose of the object. A 3D model of the predetermined type may be modified based on the extracted features. Intrinsic and extrinsic matrices may be derived from a desired camera focal length and the pose of the object. A modified video frame can then be generated by rendering a modified version of the object based on the intrinsic and extrinsic matrices, and the modified 3D model of the object. In some aspects, extracted features can be filtered for temporal consistency, and areas of the source image frame that do not include the object may be extended or otherwise modified to accommodate the modification of the object. In some aspects, the source video frame is modified by two-dimensional (2D) morphing based on projections of feature point locations of the modified 3D model.

In some aspects, an object detected in video can modified for aesthetic reasons, such as alteration of shape or pose, and may be based on user input. For example, an object that is a face may be perceived as more beautiful if eyes are enlarged or the nose is reduced in size. Such aesthetic modifications may be applied to captured video automatically according to a pre-determined profile when a particular object is recognized in a frame of video. Such techniques may include detecting an object of a predetermined type in a video frame; extracting features of the detected object; matching the detected object to a profile in a database; tracking the features over a plurality of frames; validating the features; and modifying the video frame based on a predetermined object alteration associated with the profile.

Figure 1A:
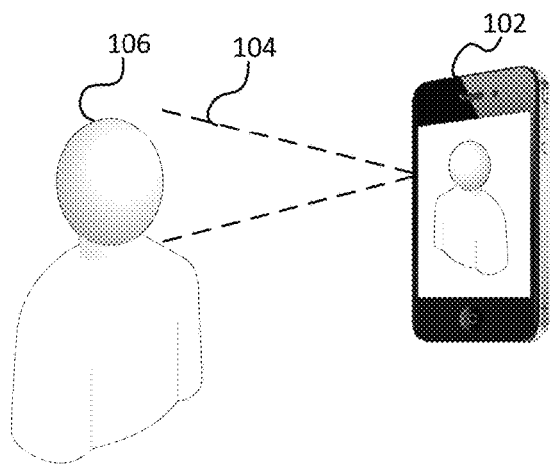
FIG. 1A depicts an example of an object being captured by an image capture system.

FIG. 1A and depicts an example of an object being captured by an image capture system. As depicted, camera system 102 may capture images of object 106 that are within the field of view 104 of the camera system 102. In the example of FIG. 1A, the camera system 102 is on the front face of a smartphone with a wide-angle lens, and an object captured is the face of a person, resulting in selfie-style images.

Figure 1B:
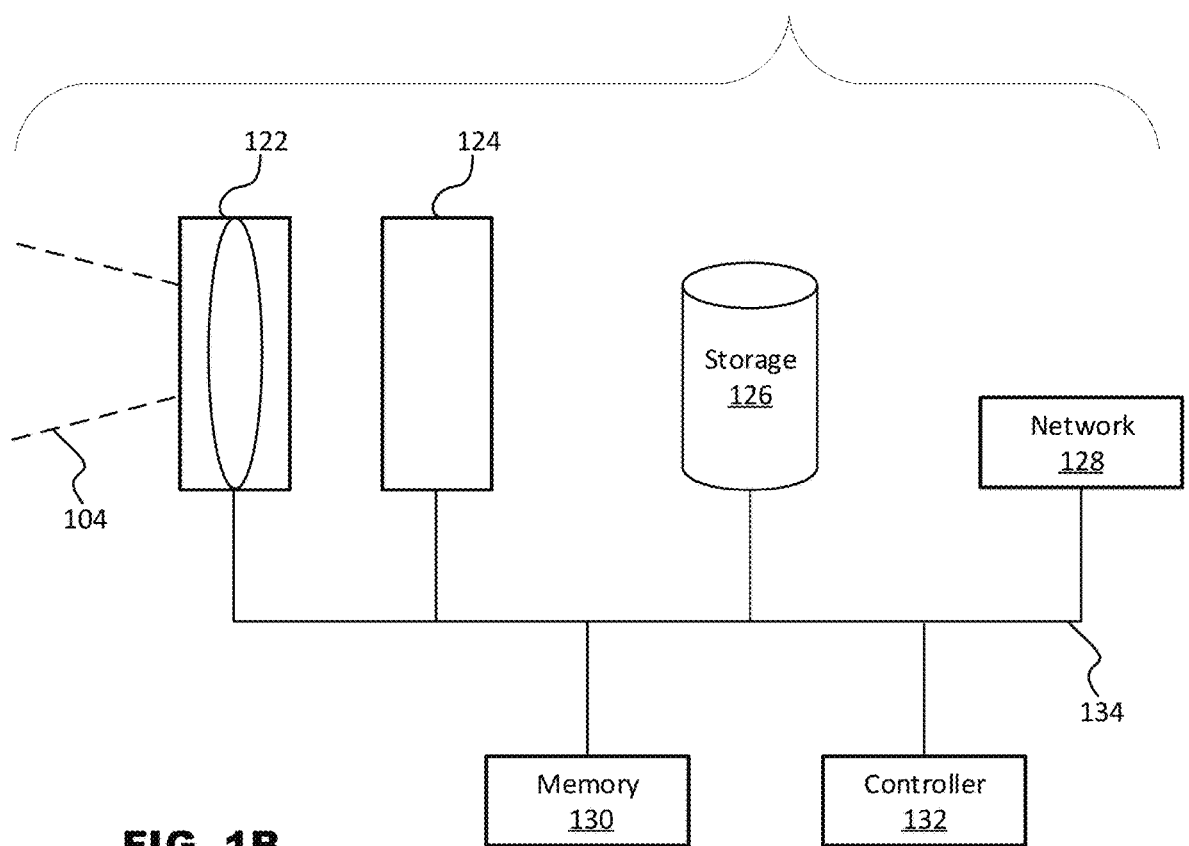
FIG. 1B depicts an example image capture system.

FIG. 1B depicts an example image capture system. Camera system 102 comprises a lens system 122 with field of view 104 and image sensor 124, as well as computer memory 130, controller 132, storage 126, and network connection 128, all interconnected via computer bus 134. Images captured by sensor 124 may be stored in storage 126 and analyzed and modified by controller 132 while in memory 130. Modified images may be stored for later use in storage 126 or transmitted real-time to a viewer via network 128. Controller 132 may control lens system 122 and sensor 124. In some aspects, and a focal length of lens system 122 may be estimated or set 132. Persons skilled in the art appreciate that while storage 126 and memory 130 are depicted as separate components in FIG.1B, in other aspects, functionalities of storage 126 and memory 130 may be in a single component.

Figure 2:
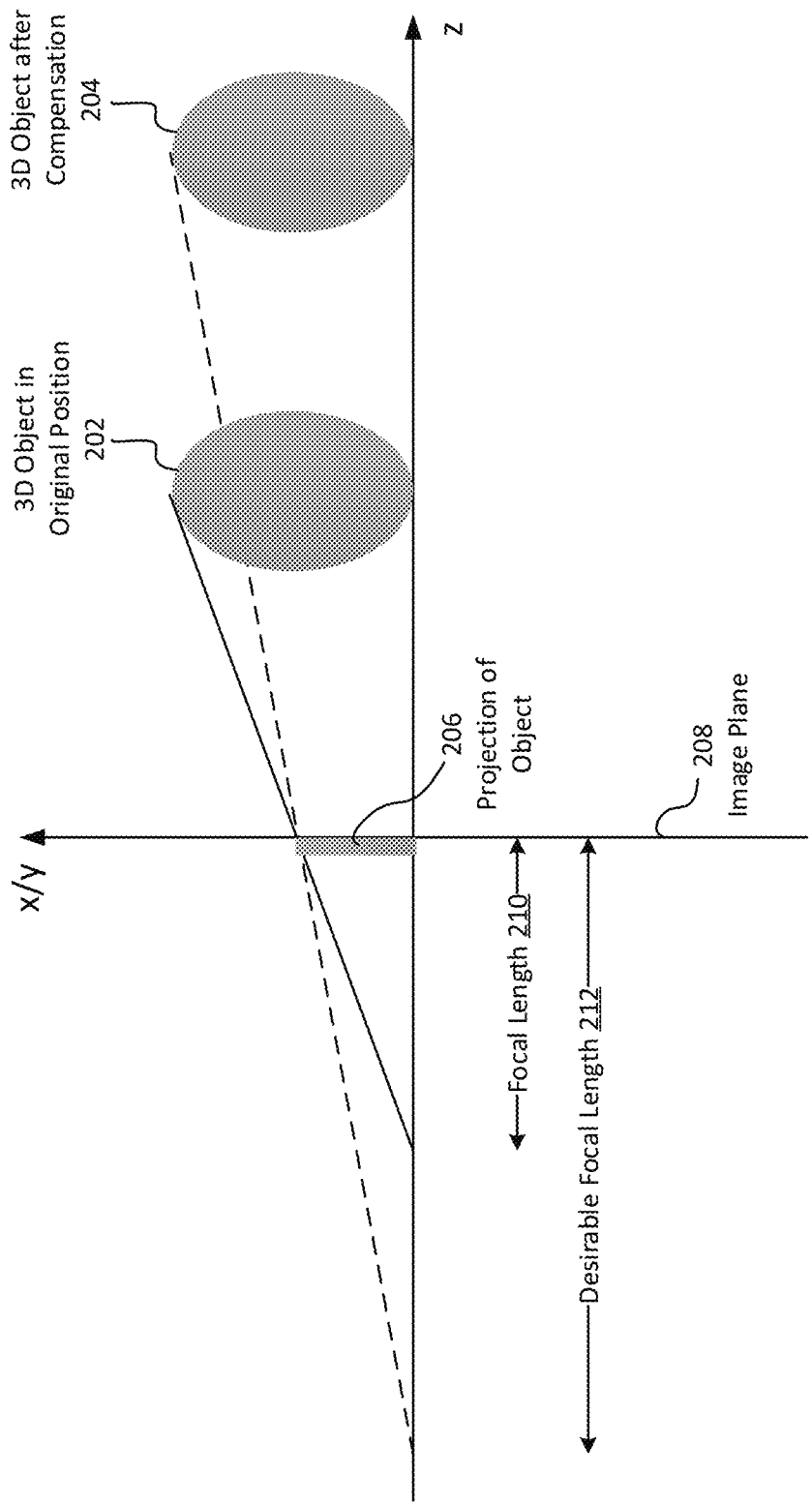
FIG. 2 depicts example projections of an object onto an image plane.

FIG. 2 depicts example projections of an object onto an image plane. An object in an original position 202 is depicted at a first distance from image plane 208 along the z-axis. A projection of the object onto the image plane 208 with focal length 210 results in projection 206 of the object on image plane 208. A camera with focal length 210 would result in a captured image of the object in the original position 202 as projection 206. Such a captured image may be modified according to a desirable focal length 212, by moving the object from the original position 202 to the compensated position 204 at a longer distance from image plane 208 along the z-axis. Moving the object from position 202 to position 204 may result in a projection of the object onto image plane 208 with desirable focal length 212 that is the same or similar size as the projection 206 of from the object in the original position 202. In alternate aspects (not depicted), the projection of an object moved from the original position 202 may result in a projection on the image plane 208 that is either larger or smaller than projection 206 from the original position. An intrinsic matrix and extrinsic matrix can be used to create a projection of the 3D model onto the image plane. An intrinsic matrix may be determined based on camera parameters, while an extrinsic matrix may be based on a pose (orientation) and position of the 3D object.

For example, if an image of the object in position 202 is captured with a wide-angle camera having focal length 210, some lens distortion can be removed from the captured image by modifying the projection 206 to appear as if the object were captured at compensated position 204 with a camera having desirable focal length 212. In order to modify the captured image, a pre-existing 3D model of the object can be fit to match the captured projection 206. An intrinsic matrix can be created using the desirable focal length, and an extrinsic matrix can be created using the compensated position 204 of the object. The 3D model can then be projected onto the image plan to generate a projection to replace the projection of the object in the original image. In one aspect, portions of the original image that do not include the object remain the same. In another aspect, portions of the original image outside the object may also be modified, for example, when altering the shape of the object reveals or obscures a portion of the image that was not revealed or obscured in the unmodified original image.

Figure 3A:
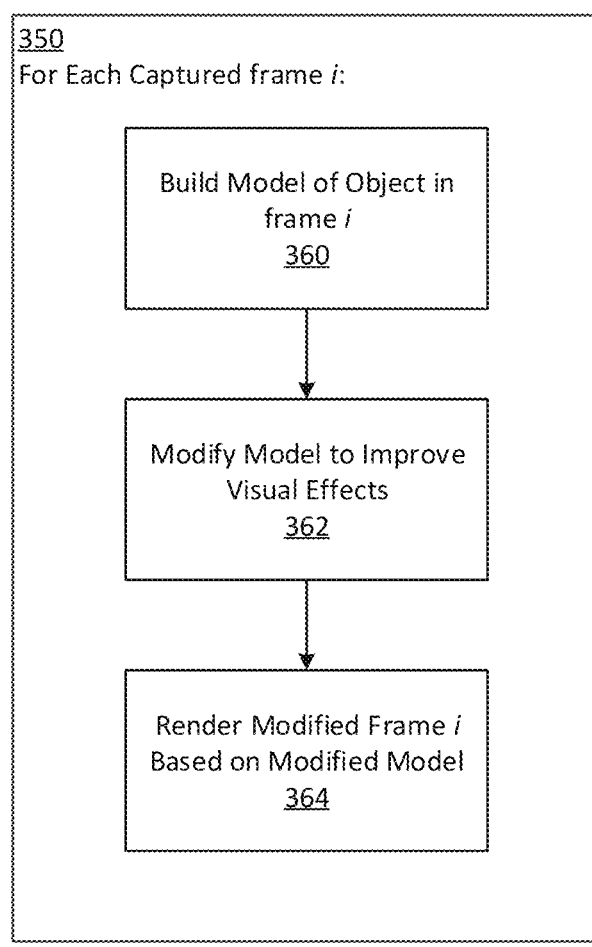
FIG. 3A is an example flowchart for modifying video images.

FIG. 3A is an example flowchart for modifying video images. For each captured frame i (box 350), a model of an object in frame i is built (box 360). For example, a new model is created or pre-existing model may be modified. In some cases, a preexisting generic model, such as a model of a generic human face or other object, may be customized to match features detected in the captured frame i. In other cases, a preexisting model that is already tailored to the specific object, for example based on data in one or more frames other than frame i, may be further tailored to current frame i using, for example, features extracted from current frame i. The model of the object is then modified to improve visual effects, for example by reducing lens distortion, or altering the same of the object according to improve a perceived beauty of the object, such as may be specified by user input (box 364). The modified model is then used to render a modified frame i, for example by creating a new rendering of the object, and replacing the captured rendering of the object in captured frame i with the new rendering of the object while leaving substantially intact the background of the object in captured frame i.

Figure 3B:
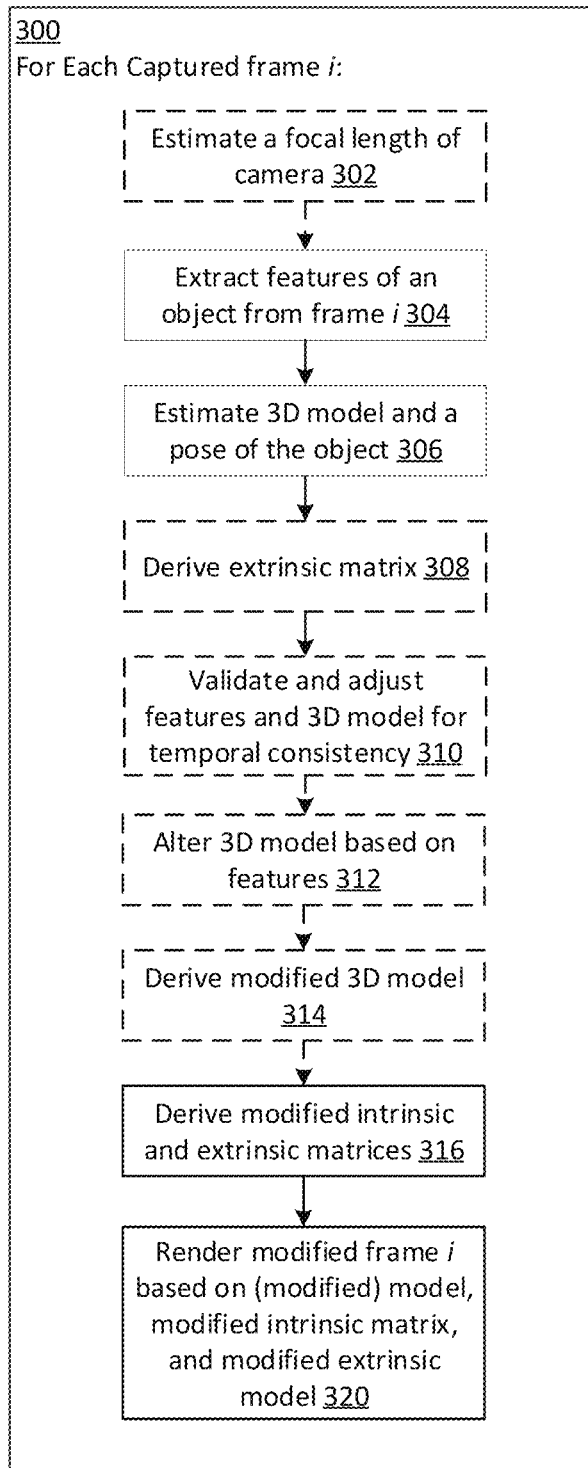
FIG. 3B is an example flowchart for modifying video images.

FIG. 3B is an example flowchart for modifying video images. Process 300 may be repeated for each captured frame i of a video sequence. Dashed boxes are optional, such as boxes 302, 308, 310, 312, and 314. In optional box 302, a focal length of the camera capturing the video may be estimated. In some aspects this may vary per frame as the camera lens system is zoomed or focused, and the estimate may be based on data obtained directly from the lens systems or based on control signals sent to the lens system. In other aspects, a camera's focal length may be fixed and known, and hence not estimated per frame. A source intrinsic matrix may be determined based on an estimated focal length.

Boxes 304-312 build or modify a model of an object in captured frame i. In box 304, features of an object in the captured frame i are extracted. Features may include 2D locations in the captured frame i of visually distinct features. For example, if the object is a face, extracted features may include locations of facial features, such as the locations of the tip of the nose, the corners of the eyes, and the corners of the mouth. In box 306, a 3D shape and a pose of the object may be estimated. If a pose or 3D shape for a previous frame exists, box 306 may estimate the pose and/or 3D shape for frame i based in part of the pose and/or 3D shape of the previous frame. A pose may include the 3D angular position of the object. The pose estimated from captured frame i may be used to derive a source extrinsic matrix in optional box 308. The 3D shape estimated in box 306 may be, for example, a 3D wireframe model. If a pose or 3D shape estimate already exist for a previous captured frame and stored in, for example, storage 126 and/or memory 130, a current pose or 3D shape may be estimated based on the pre-existing pose or shape estimates.

In box 310, the extracted features may be validated and adjusted for temporal consistency with features extracted in other frames (before or after frame i). For example, the same features may be tracked from frame to frame, and the location of corresponding features may be filtered to smooth the motion of the extracted features. Additionally, in box 310, the 3D shape, such as a 3D wireframe model, may also be validated and adjusted for temporal consistency. Adjustments for temporal consistency may reduce noise in the estimates of features and 3D model for a current frame, and such adjustments may also reduce the effect of noise in prior estimates of the features and 3D models. Consequently, over time, new extracted features may appear, and previous extracted features may disappear. Adjustments in optional box 310 may address new and disappearing features. Validation of features and 3D model in box 310 may include validation techniques of box 422 of FIG. 4, described below. For example, if the features or 3D model for the current frame is not validated, various techniques may be used to mitigate the visual effects of invalid features or model. For example, the current frame may be dropped (e.g., not adjusted, not used in future processing, and/or not displayed), or a new set of features or new 3D model may be estimated using alternative means. In the situations where no object is detected in the current frame, pixel-level techniques maybe used without estimates of features or a 3D model to modify the current frame to prevent sudden visual temporal changes without dropping the frame.

Areas of a current frame outside the object may also be modified, for example, when altering the shape of the object reveals or obscures a portion of the current frame that was not revealed or obscured in the unmodified current frame. Pixel-level modification techniques may be provided to solve this problem of revealed or obscured background. In another aspect, a background of the object may also be independently tracked over time such that the background hidden behind the object in the current frame may be constructed from the background of other frames where the object does not obscure the same background area, for example because the object tin the other frames may be at a different location in the frame or a smaller size.

In box 312, a preexisting model of an object of known type may be modified based on the extracted features. For example, the extracted features of an object believed to be a face may be mapped to a generic 2D or 3D wireframe model of a face, and then the corners of the generic wireframe model may be altered based on the extracted features. For example, the modification of a generic face may include widening the space between the eyes or enlarging the nose to match extracted features determined to correspond to corners of the eyes or tip of the nose. If a pre-existing model of the particular object in captured frame i exists, for example as a result of modifying a generic model based on previous frames, then in box 312 the pre-existing model of the particular object in captured frame i may be modified to account for changes to the object (for example, changes since a previous frame).

In some aspects, the model may include attributes of an object other than feature locations. For example, a face model may include expression attributes, which can include a degree of smile attribute that relates to the width between corners of the mouth. Alternatively or additionally, persons skilled in the art will appreciate that the estimated 3D model may include any other suitable attributes. One or more of these attributes can be adjusted in real time as the video images are being captured and processed.

Boxes 314-316 modify the previously built model of the object to render a more desirable image in box 320. In optional box 314, the 3D model may be further modified according to user input either in real-time or as previously stored options (as further described in box 430 of FIG. 4). In other words, the 3D model may be modified by changing elements that do not necessarily correspond to estimated 2D features. For example, eyes in a face model may be enlarged by moving feature locations corresponding to the corners of the eyes. As another example, the degree of smile may be increased. In some cases, such user-specified modifications may enhance or exaggerate certain facial features or characteristics.

In box 316 a modified intrinsic and extrinsic matrix may be derived. For example, a modified intrinsic matrix may be based on a desired focal length, and a modified extrinsic matrix may be derived corresponding to the desired focal length. For example, as explained above regarding FIG. 2, a modified extrinsic matrix may be based on a compensated location along the z-imaging axis that accounts for the change in focal length, such that the compensated location will produce a projection of the object in the image plane having a size in the image plane similar to the projection size of the object at the original location captured with the original focal length.

Finally, in box 320, a modified frame i may be rendered based on projecting the modified object model onto the image plane using the modified intrinsic matrix and modified extrinsic matrix. Rendering may be done in various ways, such as by ray-tracing a 3D model, or 2D morphing of the original object image. In 3D ray-tracing, the modified 3D model is ray-traced onto the image plan with the modified intrinsic and extrinsic matrices, and then pixels in the captured image containing the object are replaced with the newly ray-traced rendering of the object. In 2D morphing, the original image of the object may be tessellated according to 2D locations of extracted features. The modified 3D model and modified intrinsic and extrinsic matrices may be used to determine new locations for the extracted 2D features. The tessellated original 2D image of the object can be then be morphed to match the new 2D feature locations.

Figure 4:
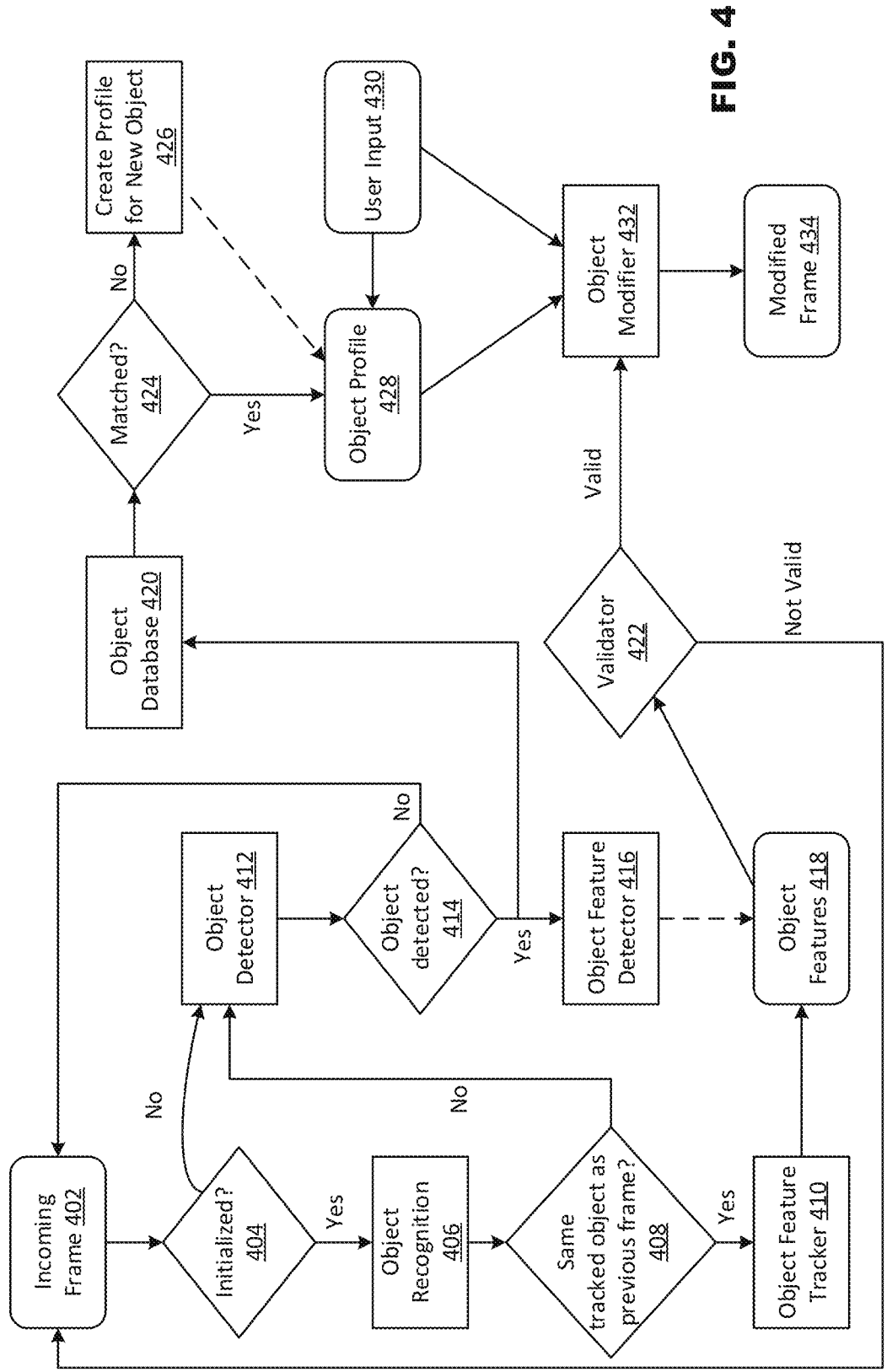
FIG. 4 is an example flowchart for modifying video images.

FIG. 4 is an example flowchart for modifying video images. Real-time modification of a rigid 3D object such as a face, including, for example, modification for beautification or other special visual effects, may be realized through a combination of object recognition, object detection, object feature extraction and tracking, 3D object modeling, optimization and morphing/rendering. If the object is a face, modification may include face recognition, face detection, facial feature extraction and tracking, and 3D face modeling. FIG. 4 depicts a flowchart for modifying a face.

In FIG. 4, a camera system such as camera system 102 of FIGS. 1A and 1B may capture a frame (box 402). If the system has not been initialized (box 404), an initialization process may begin at box 412. Prior to modifying images of the object, an initialization process will invoke an object detector (box 412). If an object is detected (box 414), features of the object will be detected (box 416), for example for tracking features across future frames, and a search may be performed for the detected object in an object database (420).

If it is a new object that does not exist in the database (box 424), an initialization process may be conducted to establish a new object profile (boxes 426, 428) that may include a 3D object model for the new object and modification preferences (430) such as beautification parameters or other desired effects desired. In some aspects, modification preferences may be specified by a user of the modification system. For example, each instance of an object (such as each face) may be assigned a unique ID using feature detection (box 416) to determine object features (box 418) and face or object recognition technology. In other aspects, object recognition techniques may identify or assign a unique object ID without reference to the features detected in box 416. At the same time, a 3D model can be quickly obtained for the object. In some aspects, existing images and videos stored in system 102 or found on an external server may be used instead of or in addition to the incoming frames to obtain the 3D model for the object.

A user can then provide a few options as to how she or he wants to modify her or his face or other object (box 430). Modification options may include, for example, shape manipulation or perspective change. The initialization process may be completed by saving the modification options as morphing parameters (box 428).

Later, when an object with an existing profile appears in an incoming frame (box 402) after initialization, the corresponding unique object ID may be retrieved from the database by an object or face recognition process (box 406) together with the saved object model and user-specified morphing parameters. If the same object is found as in a previous frame, the features of the face or other object are tracked over time in frames containing the same face (box 410) to obtain temporally consistent facial features.

On the other hand, if the recognized object cannot be tracked in the current incoming frame or is not the same as a previous frame (box 408), the initialization process described above is started at box 412. The object detector (box 412) may be called and, if an object is found (box 414), the feature detector (box 416) may provide a new set of object features for subsequent operations and frames, and object database initialization may continue as described above from box 420.

Object or facial features (box 418) are validated (box 422). Validation may involve any number of suitable metrics. Validation may include, for example verifying that the amount of change (the amount of motion) of a feature tracked in 2D pixel space of the incoming images is smooth. Alternately, or in addition, the features tracked in the incoming 2D images may be mapped to features of a 3D model. For example, 2D feature locations in 2D space may be mapped to 3D vertex locations of a 3D wireframe model of the object or face. Validation may ensure, alternately or in addition to 2D smoothing, that motion or other change of 3D model features is smooth. As another example, in addition to smoothness, validation may determine whether the derived features may result in a shape that looks like the tracked object. Typically, machine learning techniques may be used, for example, to gauge the likelihood that the detected features are reliable. As yet another example, the validation process may address features that appear or disappear.

If the validation process fails for an incoming frame, the frame may be dropped and not modified, and the process continues with the next incoming frame (box 402). If the tracked features are validated, the object may be modified based on retrieved user-specified morphing parameters (box 432) to produce a modified frame (box 434) comprising the modified object. In an aspect, the portions of the incoming frame that did not include the recognized object may not be substantially changed. The object modification process may, for example comprise the object model modification of FIG. 3B box 314, and modified frame (box 434) may be produced using rendering process FIG. 3B box 320, which are described above.

In an alternate aspect, pixel-level techniques may be used to construct a modified frame instead of dropping a frame. For example, if validation in box 422 fails, or if an object is not detected in box 414, instead of dropping the frame, pixel-level techniques may be used to construct a modified frame. In cases where a previous frame has already been modified, and either validation or object detection fails for a current frame, presentation (or other use) of the current unmodified frame following previous modified frames may create undesirable visual artifacts. Similarly dropping a frame may create an undesirable visual artifact. In these cases, a pixel-level technique for modification of the current frame may employ parts of the 3D model or other understanding of the current or previous frame content along with pixel-level techniques to render a modified current frame without rendering based on the complete 3D model, as in box 320. Examples of the understanding of a frame that is not the complete 3d model include: an understanding of the separation between, or locations of, the object and the background; an understanding of movement of the object; and an understanding of the 3D shape of the object.

3D object models can also be built from photo libraries that are stored locally on the device performing the process of FIG. 4, or in an external server (e.g., the cloud). Face recognition may be used to automatically identify photos of a certain object (or user face) in the photo library. A screening process may select the photos that are most suitable for model building. Then, optimization techniques can be applied to find the optimal 3D face model from these face photos. The system can also be extended to non-face rigid objects. For each object, an object detector and a model builder/estimator can be built. Once the object is detected and its 3D shape estimated, the same techniques can be applied to manipulate the objects and render different effects. In some aspects, multiple objects may be processed and modified within the same incoming frames.

Some aspects may be implemented, for example, using a non-transitory computer-readable storage medium or article which may store an instruction or a set of instructions that, if executed by a processor, may cause the processor to perform a method in accordance with the disclosed aspects. Controller 132 of FIG. 1B is an example of such as processor. The exemplary methods and computer program instructions may be embodied on a non-transitory machine readable storage medium. In addition, a server or database server may include machine readable media configured to store machine executable program instructions. The features of the aspects of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some aspects, variations within the scope and spirit of the invention will be apparent to those of ordinary skill in the art. Thus, the invention should be considered as limited only by the scope of the appended claims.

We claim:

1. An image processing method comprising:
   detecting an object in a video frame as a preselected type of object;
   extracting features of the detected object;
   tracking the features over a plurality of frames;
   validating the features; and
   selecting, based on the validated features, a matching profile in a database of profiles for instances of the preselected type of object, where the profiles include a 3D model of a corresponding instance of the preselected type of object and a user-specified shape manipulation for the corresponding instance of the preselected type of object;
   first modifying a matching 3D model of the matching profile based on the extracted features of the video frame;
   second modifying the first modified matching 3D model based on a matching shape manipulation of the matching profile;
   modifying the video frame to depict the object altered according to the matching shape manipulation including rendering the second modified 3D model.

2. The method of claim 1, further comprising:
   when there is no match for the detected object in the database, create a new profile, where the new profile includes a 3D model of the object, and includes object alterations specified by user input.

3. The method of claim 2, further comprising:
   recognizing the instance of the selected object in images from a photo or video library; and
   generating the 3D model of the instance based in part on the images from the photo or video library.

4. The method of claim 1, wherein the profile includes a 3D model of the object, and further comprising
   modifying the 3D model to produce the selected object alteration.

5. The method of claim 1, wherein the selected type of object is a face, and matching the detected object includes face recognition.

6. The method of claim 1, wherein the validating the features includes filtering the tracked features for temporal consistency.

7. The method of claim 1, wherein the selected object alteration includes a shape modification or a pose change.

8. The method of claim 1, further comprising:
   recognizing the detected object as the same object detected in a previous video frame;
   and wherein the tracking tracks features of detected objects recognized as the same object detected in the previous video frame.

9. The method of claim 1, further comprising:
   assigning a unique ID to the object based on the extracted features;
   wherein the matching profile includes the unique ID.

10. An image processing method comprising:
    detecting a user's face in a first video frame in a source video;

extracting features of the detected face in the first video frame;
tracking the features over a plurality of frames;
validating the features in the first video frame;
matching the detected face to a profile of the user in a database of a plurality of user profiles based on the validated features, each user profile for a corresponding user having a 3D model of the corresponding user's face and a shape manipulation of the corresponding user's face;
first modifying the 3D model of the matching user's profile to the first video frame based on the extracted features of the first video frame;
altering the user's face in the first video frame by at least second modifying the first modified 3D model based on the shape manipulation of the user's matching profile, and
modifying the first video frame to depict the detected user's face altered according to the shape manipulation in the user's matching profile, the modifying including rendering the second modified 3D model.

11. The method of claim 10, further comprising:
detecting the user's face in a second video frame of the source video;
extracting features of the detected face in the second video frame;
when a validation of the features in the second video frame fails, creating a modified second video frame of detected user's face altered according to the shape manipulation via alternate pixel-level techniques.

12. The method of claim 10, wherein the modified first video frame includes an intact background of the first video frame augmented with data from other frames of the sour video near a foreground/background separation where the shape manipulation of the user's face reveals a background region not included in the first video frame.

13. An image processing system, comprising:
a memory; and
a controller that, for a frame of a video source captured by a camera:
detecting an object in a video frame as a preselected type of object;
extracting features of the detected object;
tracking the features over a plurality of frames;
validating the features; and
selecting, based on the validated features, a matching profile in a database of profiles for instances of the preselected type of object, where the profiles include a 3D model of a corresponding instance of the preselected type of object and a user-specified shape manipulation for the corresponding instance of the preselected type of object;
first modifying a matching 3D model of the matching profile based on the extracted features of the video frame;
second modifying the first modified matching 3D model based on a matching shape manipulation of the matching profile;
modifying the video frame to depict the object altered according to the matching shape manipulation including rendering the second modified 3D model.

14. A computer readable memory comprising instructions that, when executed by a processor, cause
detecting an object in a video frame as a preselected type of object;
extracting features of the detected object;
tracking the features over a plurality of frames;
validating the features; and
selecting, based on the validated features, a matching profile in a database of profiles for instances of the preselected type of object, where the profiles include a 3D model of a corresponding instance of the preselected type of object and a user-specified shape manipulation for the corresponding instance of the preselected type of object;
first modifying a matching 3D model of the matching profile based on the extracted features of the video frame;
second modifying the first modified matching 3D model based on a matching shape manipulation of the matching profile;
modifying the video frame to depict the object altered according to the matching shape manipulation including rendering the second modified 3D model.

* * * * *